Oct. 27, 1925.

J. J. POWER

ENSILAGE MACHINE

Filed Aug. 17, 1923

1,558,502

INVENTOR.
Jeffrey J. Power
BY
ATTORNEYS.

Patented Oct. 27, 1925.

1,558,502

UNITED STATES PATENT OFFICE.

JEFFREY J. POWER, OF MADISON, WISCONSIN, ASSIGNOR TO POWER-STEVENS FAN DEVICES COMPANY, OF MILWAUKEE, WISCONSIN, A CORPORATION OF WISCONSIN.

ENSILAGE MACHINE.

Application filed August 17, 1923. Serial No. 657,867.

*To all whom it may concern:*

Be it known that I, JEFFREY J. POWER, a citizen of the United States, residing at Madison, county of Dane, and State of Wisconsin, have invented new and useful Improvements in Ensilage Machines, of which the following is a specification.

This invention relates to ensilage machines and is particularly directed to a machine which combines a cutter and delivery mechanism for conveying the cut ensilage to the silo or other storage place.

In machines for cutting ensilage and the associated delivery machine, such for example, as a fan, it has been found that considerable power is required to operate this group of mechanism. As is well known, it is necessary to provide a flywheel upon the cutter shaft so as to insure smooth running of the cutter and to prevent excessive strains being placed upon the driving belt. It is also customary to run the driving belt first over the cutter pulley and then over an idler and then over the fan pulley. This causes the belt to drive upon both sides and seriously interferes with the life of the belt and the even wear thereof as belts are usually provided with one driving surface only.

It is therefore an object of this invention to provide a combined cutter and delivery mechanism in a single unit so designed that the belt is subjected to wear upon only one side and so related that a material saving in power is effected.

A further object is to so relate the delivery fan or device with the cutter that the usual flywheel may be dispensed with and a more pronounced flywheel action secured without any additional expenditure of power but with a material saving in power over that usually required for machines of this type.

In ensilage cutters, it is customary to provide a safety device, such for example, as a shear pin connection between the driving pulley and the shaft of the cutter at one end and at the other end to provide a similar safety device between the cutter shaft and the flywheel. These safety devices are frequently made in the form of a clamping nut which frictionally engages a collar mounted upon the shaft and retained in place by shear pins. These fittings or safety devices are mounted upon the outside of the cutter casing and are exposed to the weather with the natural result that rusting and binding occur so that the safety device is not a sure protection against damage as the force required to rupture the mechanical connection is often more than sufficient to permanently damage the machine.

It is therefore a further object of this invention to provide a safety device for coupling the cutter to the driving shaft in such a manner that the device is always protected from the weather and a reliable mechanism is secured which always requires the same amount of force to effect a rupture of the mechanical connection.

A further object is to provide a safety device which will release the cutter when excessive load is placed thereon thereby providing minimum inertia for the rotating cutter and associated parts so that quick stopping may occur and to yet maintain driving connection between the operating pulley and the delivery mechanism so that clogging of the machine will not result although the cutter stops.

An embodiment of the invention is shown in the accompanying drawings, in which.

Figure 1:
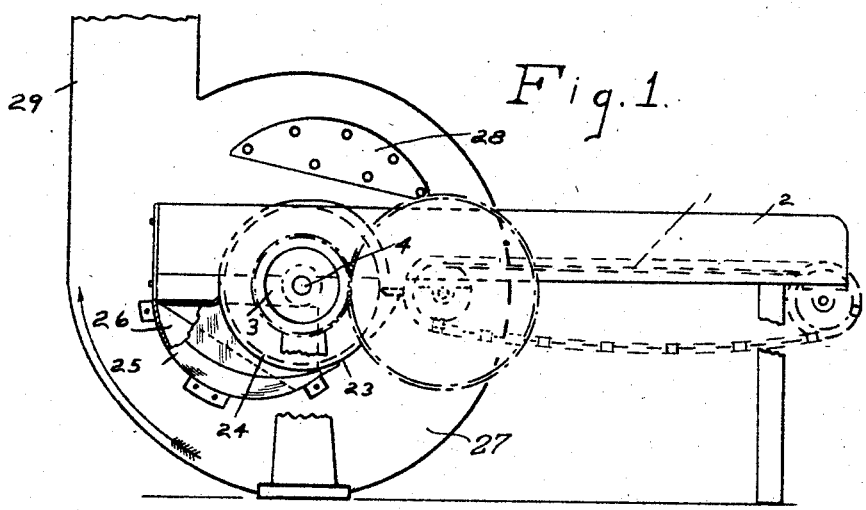
Fig. 1 is a diagrammatic side view of the invention.

In the drawings, a diagrammatic showing of a cutter and rotary discharging device has been made as associated with a delivery belt or conveyor 1 operating within a trough 2 to deliver cornstalks, fodder, or other material to the cutter. The entire power for the mechanism is supplied by means of a belt operating upon the driving pulley 3. This driving pulley is fast upon a transverse shaft 4 which shaft is provided with suitable bearings and carries intermediate its ends the cutter 5 and at its opposite end the rotary portion 6 of the discharging device. The power for operating the conveyor 1 is supplied thru suitable gearing.

The cutter comprises a plurality of supporting spiders 8, 9 and 10 having the corresponding arms integrally joined by means of webs 11 and 12. Above these webs, the helical cutter blades 13 are adjustably mounted being locked in position by means of a bolt 14 and nut 15 provided with suitable spacing washers. The adjustment of these blades is secured by means of a set screw 16 which may be provided with a lock nut 17 to lock such screw in adjusted position. The central portion of each spider constitutes a hub which is designed to loosely ride upon the driving shaft 4. Adjacent the central spider 9 a hub 18 is keyed to the shaft 4 and has a machined face contacting with the adjacent machined face of the central spider 9. A plurality of shear pins 19 are provided which pass thru the flange 20 of the hub 18 and thru the central spider 9. It has been found that a pair of such pins placed 90° apart is effective in operation. The ends of the shear pins may conveniently be bent or slightly enlarged to prevent accidental withdrawal. A collar 21 is secured upon the driving shaft 4 by means of a set screw 22 and serves to aid in positioning the cutter at the proper point along the driving shaft 4. The cutter, it will be noted, is housed within a casing. The casing 23 is open at 24 over the inlet trough 25 to permit the air to enter along the side of the trough throughout its length and thereby to facilitate the creation in the trough of a whirling air current hereinafter to be referred to. This inlet trough is open to the exterior along its upper portion and leads into the segmental opening 26 in the casing 27 of the rotary discharging device. A corresponding segmental cavity, diametrically opposite the cavity 26, may conveniently be provided in case such additional inlet is desired for any purpose and may be closed by a plate 28 bolted in position. It is to be noted that in place of making the spiders 8, 9 and 10 of integral construction, that is, joined by the webs 11 and 12, they may be made separate in an obvious manner and independently mounted upon the shaft 4. However, the central spider will be the driving one as in the illustrated form. This construction permits changing from right hand spirally shaped cutters or parting devices to left hand cutters or parting devices as it is only necessary to rotate the end spiders about the shaft 4 upon which they are loosely mounted to accommodate either right or left hand cutters.

In addition to the use of this device as an ensilage machine, it may be also used for delivering wet concrete by providing blunt cutters or simply bars of any suitable material in place of the knives illustrated in this form. The concrete is fed in place of the ensilage and the rapidly rotating bars break the oncoming stream of concrete and cause it to be more or less sprayed into the trough. In this condition, it is caught by the whirling entering stream of air and does not have a chance to clog or adhere to the side walls of the device, the rotary discharging device receiving the concrete and delivering it in its divided state. In this manner, it is possible to handle ordinary wet concrete without clogging the device. This wet concrete in its divided state may be delivered to any desired pipe in the same manner that the cut ensilage is delivered.

Figure 2:
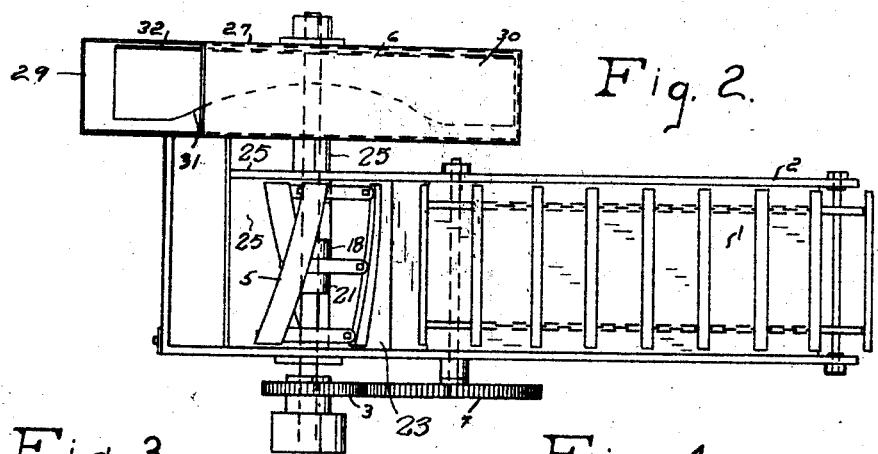
Fig. 2 is a plan view thereof.
Figures 3, 4:
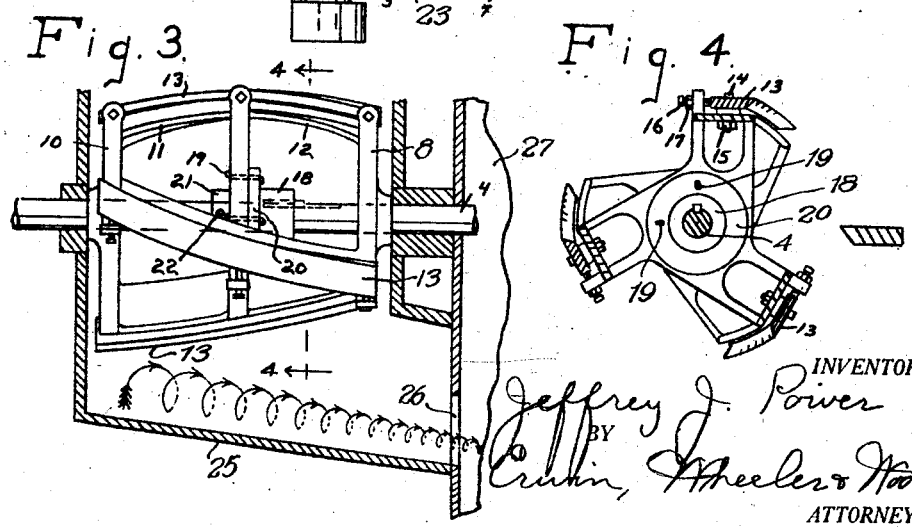
Fig. 3 is a fragmentary detailed view of the cutter and safety device.
Fig. 4 is a section on the line 4—4 of Fig. 3.

The rotary discharging device comprises a casing 27 which is of the general shape indicated in Figs. 1 and 2 and is provided with an outlet chute 29. The rotary portion 6 of such device comprises a plurality of radial blades having enlarged outer ends 30 and a tapered edge 31 of the general form indicated in dotted lines in Fig. 2. These radial blades are mounted upon a circular disk 32 upon the side of the discharging device away from the cutter. The operation of this rotary discharging device is substantially the same as that described in my prior Patent No. 798699 of September 5, 1905, for rotary discharging apparatus, and will not be described in detail in this application. Attention is, however, called to the fact that a whirling motion is produced in trough 25 in which the direction of rotation is the reverse of that of the rotary member 6 as fully set forth in said former patent and where the trough is disposed in the same relation to the rotary member. This whirling motion is very effective in conveying the cut material from the cutter to the rotary discharging device.

It has been found from actual experiments that the power required to drive this combined apparatus is very much less than the power required to drive two separate and distinct machines and the flywheel action secured from the rotary portion 6 is very much greater than that secured from the usual flywheel mounted upon the cutter shaft. It is to be noted that the energy required for driving a separate flywheel is not required in this combined machine as the rotary portion 6 of the discharging device serves the purpose of the flywheel while at the same time functioning in its designed manner. It is also to be noted that the action of the rotary discharging device is not that of the simple centrifugal fan and that the inlet is constricted with reference to the capacity of the discharging device. Under these conditions, it is possible that the rotating cylinder of air contained withing the casing 29 also cooperates to produce a flywheel action in addition to that produced by the rotary portion 6.

It will be seen from the construction disclosed that when an obstruction is encountered by the cutter, the pins 19 are sheared off and the cutter is brought to rest in an extremely short period as there is merely the momentum of the rotating cutter itself and not the momentum of any other rotating mechanism. In this manner the strains imposed upon the cutting mechanism are reduced to a minimum and the possibility of distortion and breakage is very much reduced. It is also to be noted that when the cutter ceases to operate due to this shearing of the pins 19 the drive shaft 4 continues to rotate and power continues to be supplied to the rotary member 6 of the discharging device thereby preventing clogging of the machine.

It is also to be noted that the force required to rupture the mechanical connection between the cutter and the driving shaft is always the same no matter how long the machine has been in operation. This is secured partly by the housing of the safety device within the casing 23 and partly by the manner of forming the safety device whereby binding of the driving spider between adjacent members is prevented.

It is to be further noted that the driving force is supplied to the central spider and is distributed to the other spiders partly by the webs 11 and 12 and partly by the cutter blades, thus distributing and equalizing the strains in different portions of the cutter mechanism.

It will thus be seen that an efficient, compact, unitary machine has been provided in which a very high efficiency has been secured and reliable safety devices provided together with complete freedom from danger of clogging the machine under abnormal conditions.

I claim:

1. In a device of the character described, the combination with a centrifugal fan, a casing therefor having a segmental opening at one side of its center, and a trough projecting in an axial direction from said opening and adapted to feed material thereto; of a rotary cutter operable adjacent said casing and arranged to deliver material to said trough; and a cutter housing extending above said casing and partially covering said trough, said housing providing an opening above one margin of said trough, whereby to facilitate creation in said trough of whirling air currents induced by the fan and casing aforesaid.

2. In a device of the character described, the combination with a centrifugal fan, a shaft therefor, and a casing enclosing said fan and providing an inlet opening wholly at one side of said shaft; of a cutter head mounted on said shaft externally of said casing; a trough positioned beneath said cutter head and extending to one side thereof, said trough being adapted to receive material from said cutter head and leading to the inlet opening of said fan casing; and a housing extending about said cutter head and terminating in a margin spaced from the margin of said trough, whereby to provide an elongated opening at the outside of said trough adapted to permit an influx of air whereby to facilitate the creation in said trough of an air current whirling in a direction opposite to the direction of rotation of said fan.

3. In a device of the character described, the combination with a blower fan, a shaft therefor, and a casing provided with an inlet port having an arcuate margin and two substantially radial margins; of a trough connected with said casing substantially at the arcuate margin of said port and extending laterally therefrom; a cutter head mounted above one margin of said trough and adapted to deliver material thereto; and a housing enclosing said cutter head and providing an opening adjacent the opposite margin of said trough.

4. In a device of the character described, the combination with a centrifugal fan, a fan shaft, and a casing for the fan provided with a vertical tangential delivery port and a segmental inlet port having a margin substantially horizontal, a margin substantially vertical, and an arcuate margin, said inlet port being disposed substantially beneath said delivery port; of an arcuate trough connected to said casing substantially at the arcuate margin of said inlet port; a cutter head mounted upon said shaft whereby to lie above the inner side of said trough; and a housing extending above said cutter head and terminating in a margin spaced from the outer margin of said trough, whereby to permit the entry of air to said trough in a direction tending to facilitate the creation in said trough of an air current whirling in a direction opposite to the direction of rotation of said fan.

5. In a device of the character described, the combination with a drive shaft and a cutter comprising a series of more than two spiders, each having an independent bearing on said shaft and interconnected by knives; of a hub keyed to said shaft adjacent an intermediate spider; and shear pins connecting said hub to said intermediate spider.

6. In combination, a drive shaft and a cutter comprising a plurality of spiders, one of said spiders being substantially centrally arranged and all of said spiders being revolubly mounted upon said drive shaft, a series of parting devices adjustably carried by said spiders, and a safety device operatively connecting said substantially centrally arranged spider with said drive shaft.

7. In a device of the character described, the combination with a shaft, of a rotary cutter including a pair of spaced knife supporting spiders each revolubly mounted on said shaft, and a single knife supporting spider intermediate the first mentioned spiders and having shearable connections with said shaft, said spiders being interconnected by parting devices.

8. In a combined cutting and delivery mechanism, the combination with a shaft of a rotary cutter including a plurality of knife supporting spiders each revolubly mounted on said shaft, one of said spiders being disposed intermediate the other of said spiders, a flange secured to said hub and a shear pin connecting said intermediate spider to said flange.

9. In a combined cutting and delivery mechanism, the combination with a shaft for driving said delivery mechanism, of a cutter including a plurality of knife supporting spiders each revolubly mounted on said shaft, one of said spiders being disposed intermediate the other of said spiders, a flange upon one side of said intermediate spider and keyed to said shaft for adjustment axially thereof, a positioning collar upon the other side of the last mentioned spider, and shear pins connecting said flange and last mentioned spider.

10. In a combined cutting and delivery mechanism, the combination with a shaft for driving said delivery mechanism, of a cutter including a plurality of knife supporting spiders each revolubly mounted on said shaft, one of said spiders being disposed intermediate the other of said spiders, a flange upon one side of said intermediate spider and keyed to said shaft for adjustment axially thereof, a positioning collar upon the other side of the last mentioned spider, and shear pins connecting said flange and last mentioned spider, said positioning collar being movable independently of the last mentioned spider and having adjustable means for securing it in any one of a plurality of positions axially of said shaft.

JEFFREY J. POWER.